United States Patent Office 3,536,509
Patented Oct. 27, 1970

3,536,509
AEROSOL SPRAYABLE PAINT COMPOSITION
Robert E. Tay, Mount Prospect, Ill., assignor to
Gard Industries, Inc.
No Drawing. Filed Aug. 14, 1968, Ser. No. 752,503
Int. Cl. C08b 27/38
U.S. Cl. 106—179
3 Claims

ABSTRACT OF THE DISCLOSURE

In a sprayable pigment containing coating composition a tertiary solvent system is utilized wherein the solvents for a binder resin are miscible and have boiling points which are not the same. The pigment is preferably metallic powder which prior to shaking appears to float on the surface of the solvent material. The entire composition is sprayed through the aegis of propellants which are normally gaseous under normal atmospheric pressure conditions and at room temperature.

---

This invention relates to the production of unusual metallic appearing finishes on coatings, such as paints, applied to substrates.

The application of paints and lacquers by spray techniques is not new; various methods have been developed whereby a liquid body of the coating composition may by means of pressure expanding through a small orifice cause the mass of the liquid to become finely divided into particles of substantially the same composition as the liquid body is propelled to the surface to be coated. Frequently compressed air has been used as the pressure supplying medium and the carrier to the surface. Other inert gases such as carbon dioxide, nitrogen and the like have been used in place of the air. In the instant matter, it has been found particularly efficacious to use such propellants as may be exemplified by the term "Freon."

Usually, when applying a coating to a substrate, the general desire of the resultant is to be a smooth, continuous color pigmented surface. On the other hand, it is frequent desire to achieve a surface coating which has a metallic finish. By means of the present invention, a coating may be sprayed from an aerosol-type formulation which upon drying on a substrate, without further treatment, forms a desirable, attractive, metallic appearing surface. This is accomplished by including in the formulation a plasticizer which results in floating the metallic pigment on the surface of the formulation.

Naturally, because of the rather low boiling point of the propellant, any propellant which reaches the surface of the substrate along with the coating material will also enter into the total system. However, it is not believed that much of the propellant will reach the substrate with the coating material due to the fact that the propellant produces the pressurizing medium to expel the coating material so that it does not readily enter as an ingredient in the production of the textured surface.

Accordingly, it will be appreciated that the primary object of the present invention is to produce a metallic appearing coating on a substrate by means of using a coating composition in a solvent system employing a plurality of solvents which are mutually miscible and have different boiling points. The coating composition may be usefully applied to a substrate by aerosol-type applicaion.

In the broad practice of the present invention, an efficacious first solvent is a ketone such as acetone which may be in the amount within the range between 1.0–60% by weight of the total coating formulation exclusive of the propellant. A second solvent, miscible with the first, is an ester, such as ethyl acetate which may be in the amount of 1.0 to 60% by weight of the total coating formulation exclusive of the propellant. A third solvent is Cellosolve and/or Cellosolve acetate which is ethylene monoethyl ether and ethylene glycol monoethyl ether acetate, respectively, in a range of 1.0–20.0% by weight of the total coating composition exclusive of the propellant. It has also been found useful to include a plasticizer such as a halogenated diphenyl or halogenated triphenyl, e.g., chlorinated diphenyl and/or chlorinated triphenyl. The range of the plasticizer is between 1.0 to 20% by weight of the total formulation exclusive of the propellant. The binder resin utilized may be cellulose acetate and/or cellulose acetate butyrate in an amount ranging between 1.0 to 10% by weight of the total coating formulation exclusive of the propellant.

An important feature of the present invention is the inclusion of a quantity of sucrose benzoate as a glossifying agent; the range being 0.5 to 10% by weight of the total coating formulation exclusive of the propellant.

As a useful pigment, copper powder, an alloy of copper power, or aluminum powder may be utilized. Additionally, organic and/or inorganic pigments may also be included with the metal powder pigment. The range for the pigments may be between 2 to 12% by weight of the total coating formulation exclusive of the propellant. The pigments useful herein are preferably metallic and finely divided, that is, such pigmentary material should be 200 to 400-mesh in size, preferably finer than 325-mesh, in order to avoid clogging of the nozzle of the aerosol can.

While, in the above, a broad range has been set forth in regard to the ingredients of the coating formulation per se, it is pointed out that a preferred amount of the acetone is 52.91% by weight. The preferred amount of the ethyl acetate is 17.73% by weight. The preferred amount of the Cellosolve or Cellosolve acetate is 13.91% by weight. The preferred amount of chlorinated aromatic plasticizer is 4.54% by weight. The preferred amount of the cellulose acetate or cellulose acetate butyrate is 2.18% by weight. The preferred amount of the pigment is 8% by weight. The preferred amount of the sucrose benzoate is 2.73 by weight. The percent by weight in the foregoing is of the total coating formulation exclusive of the propellant.

The concentration of the paint or coating formulation in the propellant is approximately between 40 to 70% by weight with the propellant making up the balance. A particularly useful formulation is a formulation incorporating the paint in the amount of 70% by weight, with the propellant in the amount of 30%, made up as 10% by weight Freon 12, 14% by weight isobutane and 6% by weight propane.

The liquid propellant employed in the novel composition of this invention should have a vapor pressure between about 15 and 70 pounds and preferably between about 35 and 40 pounds per square inch gauge at 70° F. Among the propellants having the above characteristics are the fluorinated or fluorochlorinated lower saturated aliphatic hydrocarbons. The preferred propellants of this type are the halogenated alkanes containing not more than two carbon atoms and at least one fluorine atom. Illustrative of these are trichloromonofluoromethane, dichlorodifluoromethane, monochlorofluoromethane, dichloromonofluoromethane, and 1,2-dichloro-1,1,2,2,-tetrafluoroethane.

The following example illustrates the preparation of a specific composition provided by this invention, but it is understood that the invention is not to be restricted thereby to the embodiment described in the example.

EXAMPLE

A self-propelling coating composition containing the following coating concentrate is prepared as follows:

| Ingredients: | Percent by weight |
|---|---|
| Acetone | 52.91 |
| Eethyl acetate | 15.73 |
| Cellosolve acetate | 13.91 |
| Chlorinated diphenyl | 4.54 |
| Cellulose acetate butyrate | 2.18 |
| Sucrose benzoate | 2.73 |
| Bronze powder (copper/zinc alloy | 8.00 |
|  | 100.00 |

The paint, consisting of acetone, ethyl acetate, Cellosolve, chlorinated diphenyl, cellulose acetate butyrate and pigments, which are previously dispersed, is charged into a container selected to receive a valve outlet so that it is about two-thirds full. The container is then pressurized with 30% of preblended propellants of the following ratio: 5 parts Freon "12", 7 parts isobutane, 3 parts propane, the remaining 70% being the concentrate, namely, paint.

It will be apparent that many changes and modifications of the several features described herein may be made without departing from the spirit and scope of the invention. It is, therefore, apparent that the foregoing description is by way of illustration of the invention rather than limitation of the invention.

What is claimed is:
1. A sprayable coating composition comprising a concentrate containing acetone as a first solvent in an amount of between 1–60% by weight of concentrate, ethyl acetate as a second solvent in an amount of between 1–60% by weight of concentrate, a third solvent in an amount of between 1–20% by weight of concentrate selected from the group consisting of ethylene glycol monoethyl ether and ethylene glycol monoethyl ether acetate, plasticizer in an amount between 1–20% by weight of concentrate, selected from the group consisting of halogenated diphenyl and halogenated triphenyl, resin binder in an amount of between 1–20% by weight of concentrate selected from the group consisting of cellulose acetate and cellulose acetate butyrate, sucrose benzoate, in an amount between .5–10% by weight of concentrate, finely divided metallic pigment in an amount between 2–12% by weight of concentrate, and normally gaseous propellant.

2. The composition of claim 1 wherein the propellant constitutes between 30 to 60% of the coating composition with the remainder being the concentrate.

3. The composition of claim 1 wherein the acetone is in an amount of 52.91% by weight of the concentrate, the ethyl acetate is in an amount of 15.73% by weight of the concentrate, the third solvent is in an amoun of 13.91% by weigh of the concentrate, the plasticizer is in an amount of 4.54% by weight of the concentrate, the resin binder is in an amount of 2.18% by weight of the concentrate, the resin binder is in an amount of 2.18% by weight of the concentrate and pigment is in an amount of 8% by weight of the concentrate and the sucrose benzoate is in an amount of 2.73% by weight of the concentrate.

References Cited
UNITED STATES PATENTS

| 2,736,665 | 2/1956 | Rogers. |  |
| 2,706,262 | 4/1955 | Barnes | 106—196 |
| 2,486,012 | 10/1949 | Ernst | 106—190 |

MORRIS LIEBMAN, Primary Examiner

T. MORRIS, Assistant Examiner

U.S. Cl. X.R.

106—190, 193, 196